United States Patent
Shin et al.

(10) Patent No.: US 6,970,268 B1
(45) Date of Patent: Nov. 29, 2005

(54) COLOR IMAGE PROCESSING METHOD AND APPARATUS THEREOF

(75) Inventors: Hyun-doo Shin, Sungnam (KR); Yang-lim Choi, Paldal-gu (KR); Yining Deng, Santa Barbara, CA (US); Bangalore S. Manjunath, Santa Barbara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/497,520

(22) Filed: Feb. 4, 2000

Related U.S. Application Data
(60) Provisional application No. 60/118,741, filed on Feb. 5, 1999.

(51) Int. Cl.[7] .............................................. G06K 15/00
(52) U.S. Cl. .......................... 358/1.9; 358/2.1; 382/253
(58) Field of Search ..................... 358/1.9, 2.1, 3.27, 358/500, 518, 515, 520; 352/162, 164, 167

(56) References Cited

U.S. PATENT DOCUMENTS
| | | | |
|---|---|---|---|
| 4,541,116 A | | 9/1985 | Lougheed |
| 4,910,598 A | * | 3/1990 | Itakura .................. 358/213.17 |
| 5,473,736 A | * | 12/1995 | Young ......................... 395/131 |
| 5,684,897 A | | 11/1997 | Kumagai et al. |

FOREIGN PATENT DOCUMENTS
| EP | 0 318 866 A2 | 6/1989 | |
|---|---|---|---|
| EP | 0 522 702 A2 | 1/1993 | ........... G06F/15/62 |

OTHER PUBLICATIONS

Aditya Vailaya, et al.; "On Image Classification: City vs. Landscape"; Published: 1998; pp. 3–8.

J. Malik, et al.; "Finding Objects In Image Databases By Grouping"; Published: 1996; vol. 1; pp. 761–764.

Alireza Khotanzad, et al.; "A Parallel, Non-Parametric, Non-Iterative Clustering Algorithm With Application To Image Segmentation"; Published: 1988; vol. 1; pp. 305–309.

Jia-Guu Leu; "Image Smoothing based on pixel grouping"; Proceedings of the international conference on image processing; (ICIP); Washington, Oct. 23–26; 1995; LOS Alamitos, IEEE Comp. Soc. Press, US, vol. 3; Oct. 23, 1995; pp. 535–538, XP010197024.

* cited by examiner

*Primary Examiner*—Jerome Grant, II (57) ABSTRACT

A color image processing method and apparatus thereof are provided. The color image processing method includes the steps of (a) sorting image pixels according to the color distance between the image pixels and a central pixel, (b) grouping the sorted pixels into groups in which the difference in the intragroup color distance is minimum and the difference in the intergroup color difference is maximum, and (c) performing filtering by replacing a central pixel value with a predetermined pixel value determined by pixel values of pixels in the groups. The color image processing method can reduce the generation of edge blurring of the image in removing impulse noise from an image and filtering the same.

47 Claims, 3 Drawing Sheets

COLOR IMAGE PROCESSING METHOD AND APPARATUS THEREOF

REFERENCE TO RELATED APPLICATION

This application claims the benefit of U.S. provisional application Ser. No. 60/118,741, filed Feb. 5, 1999, the disclosure of which is incorporated herein by reference.

BACKGROUND OF THE INVENTION

1. Field of the Invention

The present invention relates to an image processing method, and more particularly, to a color image processing method which is a pre-processing method required for retrieving a color feature descriptor used in indexing and searching a color image.

2. Description of the Related Art

In object-based digital image compression standards such as MPEG-7, color feature descriptors for indexing and searching color images are defined. A color feature descriptor is retrieved from an input image.

In the color image processing method, in order to retrieve a color feature descriptor, an input image is segmented into a plurality of regions, quantized color vectors for the segmented regions are obtained, and then the color feature descriptor of a pertinent region is determined using the quantized color vectors. However, noise components may exist in the image. Also, good color quantization is important in accurately representing color information in the image. Thus, pre-processing such as filtering or noise removal is necessarily performed before quantization.

Conventionally, in order to remove noise from an image, filtering methods such as vector median filtering or vector directional filtering have been employed.

However, since filtering method used in conventional color image processing methods are uniformly applied to an image, non-noisy pixels may be modified, which causes edge blurring in the original image.

SUMMARY OF THE INVENTION

To solve the above problem, it is an objective of the present invention to provide a color image processing method and apparatus, by which filtering can be performed without edge blurring of the color image and noise in the color image can be eliminated, the method being a pre-processing method required for retrieving a color feature descriptor for indexing and searching the color image.

It is another object of the present invention to provide a computer readable medium having a program executable by a computer to perform the color image processing method.

A feature of the present invention is embodied by a color image processing method includes the steps of (a) sorting image pixels according to the color distance between the image pixels and a central pixel, (b) grouping the sorted pixels into groups in which the difference in the intragroup color distance is minimum and the difference in the intergroup color difference is maximum, and (c) performing filtering by replacing a central pixel value with a predetermined pixel value determined by pixel values of pixels in the groups.

The color image processing method may further include the step of defining a window having a predetermined size within an input color image, wherein the image pixels are pixels within the window.

Before step (b) is performed, the method preferably further includes the step of removing pixels having a difference in color distance from the central pixel greater than or equal to a predetermined threshold, with respect to a predetermined number of pixels at the beginning and latter parts among the sorted pixels.

The predetermined number is preferably less than or equal to L/2, in which L is a predetermined positive number indicating the size of an L×L window.

Also, the step (b) may include grouping the sorted pixels using a function based on a Fisher's discriminant estimation method.

The step (b) may include the sub-steps of (b-1) setting a first group consisting of 0th through (i−1)th pixels, and a second group consisting of ith through Kth pixels, wherein i is an integer from 0 through K and $K=L^2-1$, (b-2) obtaining the respective averages of the color distance differences for pixels of the first and second groups by the following Expressions:

$$a_1(i) = \frac{1}{i}\sum_{j=0}^{i-1} d_j(n) \text{ and } a_2(i) = \frac{1}{K+1-i}\sum_{j=i}^{K} d_j(n),$$

(b-3) obtaining the respective variances of the color distance differences for pixels of the first and second groups by the following Expressions:

$$S_1^2(i) = \sum_{j=0}^{i-1} |d_j(n) - a_1(i)|^2 \text{ and } S_2^2(i) = \sum_{j=i}^{K} |d_j(n) - a_2(i)|^2,$$

(b-4) calculating a value J(i) by the following Expression, using the obtained average and variance:

$$J(i) = \frac{|a_1(i) - a_2(i)|^2}{s_1^2(i) + s_2^2(i)},$$

and (b-5) obtaining the value of i which makes J(i) maximum by the following Expression:

$$m(n) = {}_i^{arg}\{\max J(i)\},$$

and selecting pixels ranging from a pixel having a small color distance to a pixel having the obtained value of i to determine the same as a peer group P(n).

Also, after the step (b-5), the method may further include the steps of selecting i pixels ranging from the pixel having the minimum color distance among the pixels sorted according to the color distance from the central pixel and setting the largest value of the color distances of the selected pixels as the maximum color distance within the peer group, and performing color quantization by weighting the color vectors of the respective pixels by exp(−T(n)), wherein T(n) is the maximum color distance within the peer group.

Alternatively, after the step (b-5), the method may further include the steps of selecting i pixels ranging from the pixel having the minimum color distance among the pixels sorted according to the color distance from the central pixel and setting the largest value of the color distances of the selected pixels as the maximum color distance within the peer group, and obtaining the average of T(n) values of the whole image and performing color quantization using a value obtained by multiplying the average with a predetermined constant as the number of clusters, wherein T(n) is the maximum color distance within the peer group.

Also, after the step (b-5), the method may further include the steps of selecting pixels whose number corresponds to the size of the peer group, ranging from the pixel having the minimum color distance among the pixels sorted according to the color distance from the central pixel and setting the largest value of the color distances of the selected pixels as the maximum color distance within the peer group, and weighting the color vectors of the respective pixels by exp(−T(n)), wherein T(n) is the maximum color distance within the peer group, and performing color quantization using a value obtained by multiplying the average of the T(n) values of the whole image with a predetermined constant as the number of clusters.

The step (c) preferably includes replacing the central pixel $X_0(n)$ with a new pixel $X_0'(n)$ by the following Expression:

$$X_0'(m) = \frac{\sum_{i=0}^{m(n)-1} W_i p_i(n)}{\sum_{i=0}^{m(n)-1} W_i}$$

where $p_i(n)$ are the pixels constituting the peer group and $W_i$ are predetermined weights corresponding to $p_i(n)$.

Also, the step (c) preferably includes replacing the color vector of the central pixel with an average weighted by a predetermined weight that is larger for a pixel closer to the central pixel and is smaller for a pixel distant from the central pixel.

The predetermined weight is preferably a value determined by a standard Gaussian function.

The color image processing method may further include the step of performing color quantization by weighting the color vectors of the respective pixels by exp(−T(n)), wherein T(n) is the maximum color distance within one group.

According to another aspect of the present invention, there is provided a color image processing method including the steps of (a) receiving a color image frame and segmenting the same into a plurality of color images by a predetermined segmentation method, (b) sorting image pixels according to the color distance between the image pixels and a central pixel, with respect to an image selected among the segmented color images, (c) grouping the sorted pixels into groups in which the difference in the intragroup color distance is minimum and the difference in the intergroup color difference is maximum, and (d) performing filtering by replacing a central pixel value with a predetermined pixel value determined by pixel values of pixels in the groups.

According to still another aspect of the present invention, there is provided a color image processing method including the steps of (a) defining a window having a predetermined size within an input color image, (b) selecting pixels having a color vector similar to that of the central pixel within the window and defining the selected pixels as a group, and (c) performing filtering of blurring using only the pixels within the defined group.

The present invention is also embodied by a computer readable medium having program codes executable by a computer to perform a color image processing method, the method including the steps of (a) defining a window having a predetermined size within an input color image, (b) sorting image pixels according to the color distance between the image pixels and a central pixel, (c) grouping the sorted pixels into groups in which the difference in the intragroup color distance is minimum and the difference in the intergroup color difference is maximum, and (d) performing filtering by replacing a central pixel value with a predetermined pixel value determined by pixel values of pixels in the groups.

Alternatively, the present invention provides a color image processing apparatus including sorting means for setting a window of a predetermined size within an input color image and sorting image pixels in the window according to the color distance between the image pixels and a central pixel, grouping means for grouping the sorted pixels into groups in which the difference in the intragroup color distance is minimum and the difference in the intergroup color difference is maximum, and filtering means for performing filtering by replacing a central pixel value with a predetermined pixel value determined by pixel values of pixels in the groups.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, embodiments of the present invention will be described in detail with reference to the accompanying drawings.

Figure 1A:
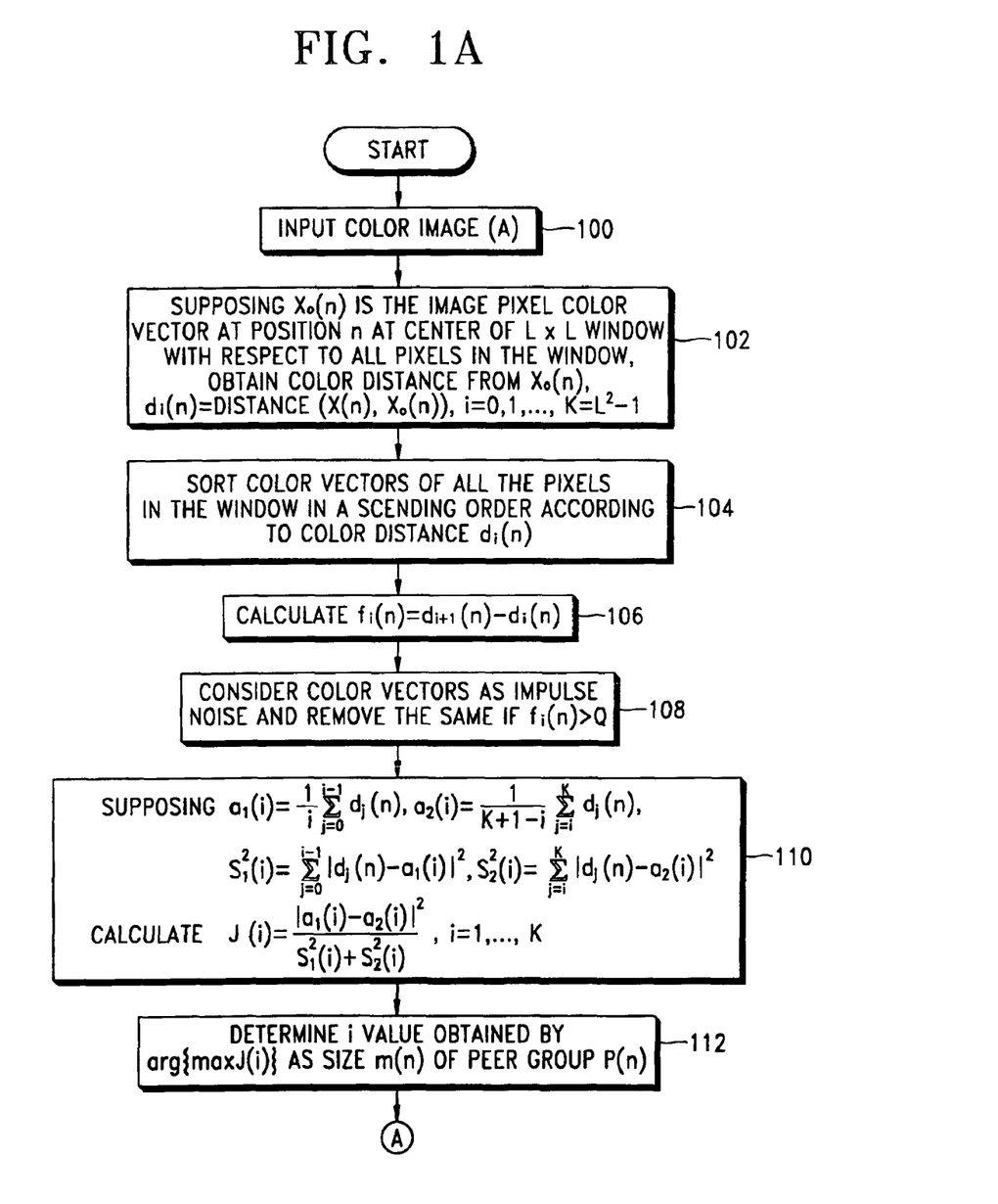
FIGS. 1A and 1B are flow diagrams showing a color image processing method according to the present invention.

Referring to FIG. 1A illustrating a color image processing method according to the present invention, a color image is input (step 100). The color image may be in one region selected among image regions segmented by an appropriate segmentation method.

Next, with respect to color vectors of all pixels in a L×L window in an input color image, the color distance $d_i(n)$ from the color vector $X_0(n)$ of a pixel positioned at a position n at the center of the L×L window is represented by Expression (1) (step 102):

$$\text{Distance}(X_i(n), X_0(n)) \qquad (1)$$

wherein L is an arbitrary positive integer, and assuming that $K=L^2-1$, i is an integer from 0 through K. Also, for convenience' sake of explanation, $X_0(n)$, which represents the color vector of a pixel positioned at a position n at the center of the L×L window in an input color image, may be used to represent the corresponding pixel positioned at the center, that is a central pixel.

Next, the corresponding color vectors of all pixels in the window are sorted in an ascending order according to the magnitude of the color distance $d_i(n)$ (step 104). Hereinbelow, the color vectors sorted in ascending order will be represented by $X_i(n)$.

Now, with respect to the color vectors sorted in ascending order, color distance difference is calculated by Expression (2) (step 106):

$$f_i(n) = d_{i+1}(n) - d_i(n) \qquad (2)$$

and then color vectors in which $f_i(n)$ is greater than a predetermined threshold Q are removed (step 108). That is, the color vectors in which $f_i(n)$ is greater than a predetermined threshold Q are considered impulse noise to then be removed. According to experimental confirmation, it is more preferably to perform the step 108 with respect to the beginning L/2 pixels and the latter L/2 pixels in ascending order, than to perform it with respect to all the ($L^2-1$) pixels in the L×L window, except of the central pixel $X_0(n)$.

Also, according to the present invention, in order to prevent edge blurring of an image, filtering is performed on pixels in a peer group to be described later, rather than on all the pixels in the L×L window. The peer groups are obtained as follows.

First, the pixels sorted in ascending order according to their color distance from the color vector of the central pixel are divided into two groups. The first group consists of 0th through (i−1)th pixels, and the second group consists of ith through Kth pixels.

Next, the average of the color distance differences for pixels of the first group and the average of the color distance differences for pixels of the second group are obtained as represented by Expressions (3a) and (3b), respectively:

$$a_1(i) = \frac{1}{i}\sum_{j=0}^{i-1} d_j(n) \quad (3a)$$

$$a_2(i) = \frac{1}{K+1-i}\sum_{j=i}^{K} d_j(n) \quad (3b)$$

and the variance of the color distance differences for pixels of the first group and the variance of the color distance difference for pixels of the second group are obtained as represented by Expressions (3c) and (3d), respectively:

$$S_1^2(i) = \sum_{j=0}^{i-1} |d_j(n) - a_1(i)|^2 \quad (3c)$$

$$S_2^2(i) = \sum_{j=i}^{K} |d_j(n) - a_2(i)|^2 \quad (3d)$$

wherein i is a newly defined integer ranging from 0 through K.

Then, using the obtained average and variance, a value J(i) represented by Expression (4) is calculated (step 110):

$$J(i) = \frac{|a_1(i) - a_2(i)|^2}{s_1^2(i) + s_2^2(i)} \quad (4)$$

wherein i is an integer ranging from 1 through K. The Expression (4) is based on Fisher's discriminant estimation method.

Here, the actual range of i is from 1 through the numbers obtained by subtracting the number corresponding to color vectors of the pixels considered as impulse noise for removal from K. However, since the number corresponding to color vectors of the pixels considered as impulse noise and removed is not so large, it is assumed that the range of i is from 1 through K.

Next, the value of i which makes J(i) maximum is obtained by Expression (5):

$$m(n) = {}^{arg}_i\{\max J(i)\} \quad (5)$$

to then determine the obtained value of i as the magnitude of a peer group P(n) (step 112). In other words, when i is reset to variables ranging from 0 through the value obtained in the step 112, the peer group P(n) consists of pixels $p_i(n)$.

Figure 1B:
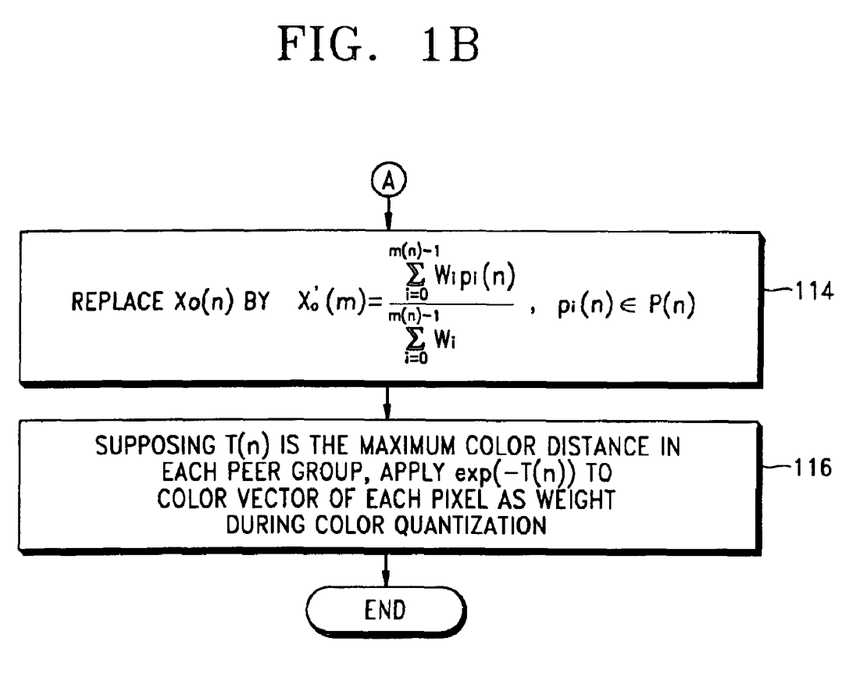

Referring to FIG. 1B, the central pixel $X_0(n)$ is replaced with a new pixel $X_0'(n)$ by Expression (6):

$$X_0'(m) = \frac{\sum_{i=0}^{m(n)-1} W_i p_i(n)}{\sum_{i=0}^{m(n)-1} W_i} \quad (6)$$

where $W_i$ are the standard Gaussian weights corresponding to $p_i(n)$ (step 114). Here, the standard Gaussian weights $W_i$ are determined by a standard Gaussian function. A pixel closer to the center of an image has a larger standard Gaussian weight and a pixel distant from the center has a smaller standard Gaussian weight. The procedure of replacing pixels in such a manner is smoothing or filtering.

Supposing the maximum color distance in each peer group $d_{m(n)-1}(n)$ is T(n), exp(−T(n)) is applied to the color vectors of the respective pixels during color quantization (step 116). The maximum color distance $d_{m(n)-1}(n)$ in each peer group indicates the largest value of the color distances of pixels whose number correspond to the size of the peer group ranging from the pixel having the minimum color distance, among the pixels sorted in ascending order according to their color distance from the central pixel. Thus, the smaller the maximum color distance $d_{m(n)-1}(n)$ in each peer group, the shorter the color distance from the central pixel, so that $d_{m(n)-1}(n)$ is an indicator of the smoothness of an image. Also, since exp(−T(n)) is weighted to the color vectors of the respective pixels, the pixels in smooth regions are more heavily weighted than the pixels in highly noisy regions. Weighting the pixels in highly noisy regions more lightly than the pixels in the smooth regions is based on the analysis result of eye-perception, that is, the eye-perception is more sensitive to changes in detailed regions than in smooth regions.

According to the present invention, during quantization, the value obtained by multiplying a predetermined constant with the average of T(n) values of all images is preferably used as the number of clusters. In other words, during quantization, fewer clusters are used in smooth regions where the T(n) value is small, and more clusters are used in highly noisy regions where the T(n) value is large.

In the color image processing method according to the present invention, only the pixels having large color distances from the central pixel are removed, and then a peer group having a color vector similar to that of the central pixel is defined to then perform filtering thereon. Thus, edge blurring of an image rarely occurs due to removal and filtering of impulse noise. Also, according to the present invention, the information on the extent of quantization to be performed on an image can be obtained.

The color image processing method is programmable by a computer program. Codes and code segments constituting the computer program can be easily derived by a computer programmer in the art. Also, the program is stored in computer readable media and is readable and executable by the computer, thereby embodying the color image processing method. The media include magnetic recording media, optical recording media, carrier wave media, and the like.

Figure 2:
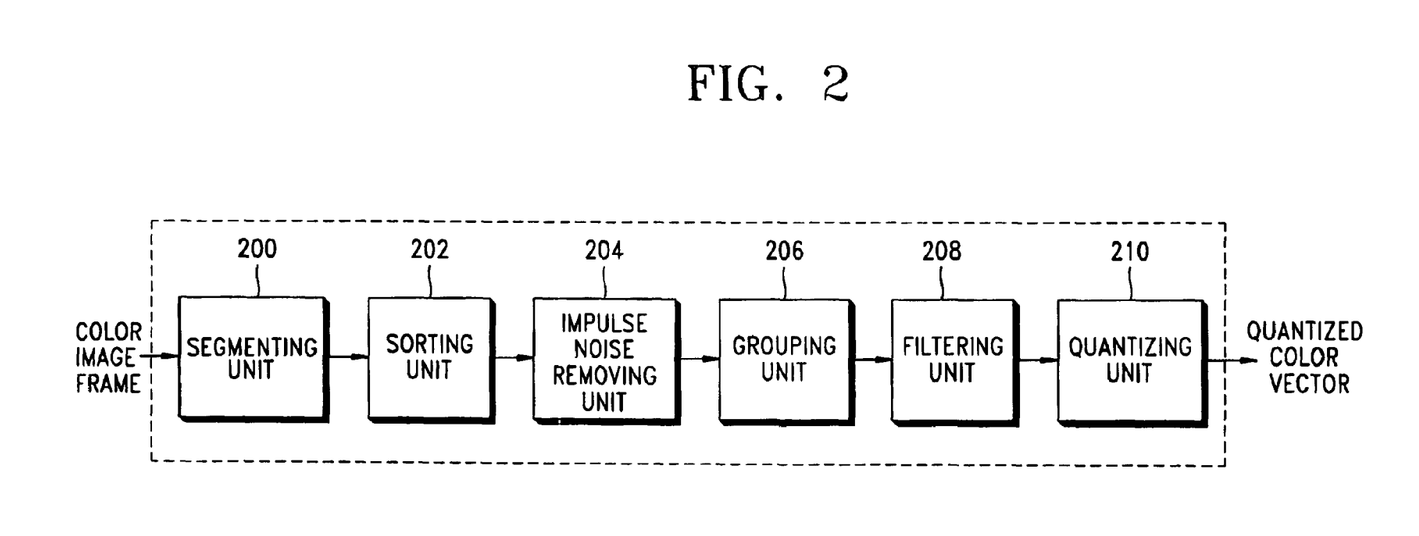
FIG. 2 is a block diagram of a color image processing apparatus according to the present invention.

Also, the color image processing method can be implemented on a color image processing apparatus. FIG. 2 is a block diagram of a color image processing apparatus according to the present invention. Referring to FIG. 2, the color image processing apparatus according to the present invention includes a segmenting unit 200, a sorting unit 202, an impulse noise removing unit 204, a grouping unit 206, a filtering unit 208 and a quantizing unit 210.

In the operation of the color image processing apparatus, the segmenting unit 200 receives a color image frame and segments the color image frame into a plurality of color images by a predetermined segmentation method.

The sorting unit 202 sets an L×L window (L is a predetermined positive integer.) within the color images, and sorts the pixels within the window according to the color distance between each pixel and the central pixel. Thus, the sorting unit 202 outputs color vectors of the sorted pixels.

The impulse noise removing unit 204 removes the pixels that have a difference in color distance from the central pixel greater than a predetermined threshold, with respect to the beginning L/2 pixels and the latter L/2 pixels among the sorted pixels.

The grouping unit 206 receives color vectors of all the noise-removed pixels in the L×L window and divides the same into two groups in which the difference in the intragroup color distance is minimum and the difference in the intergroup color difference is maximum, by calculating the function represented by the Expression (4) using the variance and average of the color distances between the sorted pixels.

The filtering unit 208 performs filtering by replacing the central pixels with pixels in a group having a small difference from the color vector of the central pixels in the window.

The quantizing unit 210 weights the color vectors of the respective pixels by exp(−T(n)), in which T(n) is the maximum color distance within a group having a small difference in the color vector from the central pixel within the window, and performs quantization using the value obtained by multiplying a predetermined constant with the average of T(n) values of all images as the number of clusters.

In the above-described color image processing apparatus according to the present invention, since the pixels having large color distances from the central pixel are removed, a peer group having a color vector similar to that of the central pixel is defined to then perform filtering thereon. Thus, edge blurring of an image rarely occurs due to removal and filtering of impulse noise. Also, according to the present invention, the information on the number of clusters for quantization to be performed can be obtained based on the smoothness or details of an image to be processed. Thus, quantization can be effectively performed using the information.

As described above, according to the present invention, in removing impulse noise from an image and filtering the same, the generation of edge blurring of the image can be reduced.

What is claimed is:

1. A color image processing method comprising the steps of:
   (a) sorting image pixels according to a color distance between image pixels and a central pixel;
   (b) grouping the sorted pixels into groups in which a difference in intragroup color distance is minimum and a difference in intergroup color distance is maximum; and
   (c) performing filtering by replacing a central pixel value with a predetermined pixel value determined by pixel values of pixels in the groups.

2. The color image processing method according to claim 1, wherein the step (b) includes grouping the sorted pixels using a function based on a Fisher's discriminant estimation method.

3. The color image processing method according to claim 1, further comprising the step of performing color quantization by weighting color vectors of the respective pixels by exp(−T(n)), wherein T(n) is a maximum color distance within one group.

4. The color image processing method according to claim 1, further comprising the step, prior to step (b), of removing pixels having a color distance difference greater than or equal to a predetermined threshold for a predetermined number of pixels at a beginning and latter parts of the sorted pixels.

5. The color image processing method according to claim 4, wherein the predetermined number is less than or equal to L/2, in which L is a predetermined positive integer indicating the size of an L×L window.

6. The color image processing method according to claim 5, wherein the step (b) includes grouping the sorted pixels using a function based on a Fisher's discriminant estimation method.

7. The color image processing method according to claim 4, wherein the step (b) includes grouping the sorted pixels using a function based on a Fisher's discriminant estimation method.

8. The color image processing method according to claim 1, further comprising the step of defining a window having predetermined size within an input color image, wherein the image pixels are pixels within the window.

9. The color image processing method according to claim 8, wherein the step (b) includes grouping the sorted pixels using a function based on a Fisher's discriminant estimation method.

10. The color image processing method according to claim 8, further comprising the step, prior to step (b), of removing pixels having a color distance difference greater than or equal to a predetermined threshold for a predetermined number of pixels at a beginning and latter parts of the sorted pixels.

11. The color image processing method according to claim 10, wherein the step (b) includes grouping the sorted pixels using a function based on a Fisher's discriminant estimation method.

12. The color image processing method according to claim 1, wherein the step (b) comprises the sub-steps of:
   (b-1) selecting a first group consisting of 0th through (i−1)th pixels, and a second group consisting of ith through Kth pixels, wherein i is an integer from through K and $K=L^2-1$;
   (b-2) obtaining respective averages of color distance differences for pixels of the first and second groups as follows:

$$a_1(i) = \frac{1}{i}\sum_{j=0}^{i-1} d_j(n) \text{ and } a_2(i) = \frac{1}{K+1-i}\sum_{j=i}^{K} d_j(n);$$

(b-3) obtaining the respective variances of color distance differences for pixels of the first and second groups as follows:

$$S_1^2(i) = \sum_{j=0}^{i-1} |d_j(n) - a_1(i)|^2 \text{ and } S_2^2(i) = \sum_{j=i}^{K} |d_j(n) - a_2(i)|^2;$$

(b4) calculating a value J(i) as follows, using the obtained average and variance:

$$J(i) = \frac{|a_1(i) - a_2(i)|^2}{s_1^2(i) + s_2^2(i)}; \text{ and}$$

(b-5) obtaining a value of i which makes J(i) maximum as follows:

$$m(n) = {}^{arg}_i \{\max J(i)\}$$

and selecting pixels ranging from a pixel having a small color distance to a pixel having the obtained value of i to determine a size m(n) a peer group P(n).

13. The color image processing method according to claim 12, further comprising, after step (b-5), the steps of:
selecting i pixels ranging from a pixel having a minimum color distance among the pixels sorted according to the color distance from the central pixel and setting a largest value of the color distances of the selected pixels as a maximum color distance within the peer group; and
performing color quantization by weighting color vectors of respective pixels by exp(−T(n)), wherein T(n) is the maximum color distance within the peer group.

14. The color image processing method according to claim 12, further comprising, after step (b-5), the steps of:
selecting i pixels ranging from a pixel having a minimum color distance among the pixels sorted according to the color distance from the central pixel and setting a largest value of the color distances of the selected pixels as a maximum color distance within the peer group; and
obtaining an average of T(n) values of a whole image and performing color quantization using a value obtained by multiplying the average value of T(n) with a predetermined constant to determine a number of clusters, wherein T(n) is the maximum color distance within the peer group.

15. The color image processing method according to claim 12, further comprising, after the step (b-5), the steps of:
selecting pixels whose number corresponds to the size of the peer group, ranging from a pixel having a minimun color distance among the pixels sorted according to the color distance from the central pixel and setting a largest value of the color distances of the selected pixels as a maximum color distance within the peer group; and
weighting color vectors of the respective pixels by exp(−T(n)), wherein T(n) is the maximum color distance within the peer group, and performing color quantization using a value obtained by multiplying an average of T(n) values of a whole image with a predetermined constant, to determine a number of clusters.

16. The color image processing method according to claim 12, wherein the step (c) includes replacing a central pixel $X_0(n)$ with a new pixel $X_0'(n)$ as follows:

$$X_0'(m) = \frac{\sum_{i=0}^{m(n)-1} W_i p_i(n)}{\sum_{i=0}^{m(n)-1} W_i}$$

where $p_i(n)$ are pixels constituting the peer group and $W_i$ are predetermined weights corresponding to $p_i(n)$.

17. The color image processing method according to claim 1, wherein the step (c) includes replacing a color vector of the central pixel with an average color vector value weighted by a predetermined weight that is larger for a pixel closer to the central pixel and is smaller for a pixel distant from the central pixel.

18. The color image processing method according to claim 17, wherein the predetermined weight is a value determined by a standard Gaussian function.

19. A color image processing method comprising the steps of:
(a) receiving a color image frame and segmenting the same into a plurality of color images by a predetermined segmentation method;
(b) sorting image pixels according to a color distance between the image pixels and a central pixel, with respect to an image selected among the segmented color images;
(c) grouping the sorted pixels into groups in which a difference in an intragroup color distance is minimum and a difference in an intergroup color distance is maximum; and
(d) performing filtering by replacing a central pixel value with a predetermined pixel value determined by pixel values of pixels in the groups.

20. The color image processing method according to claim 19, before the step (b), further comprising the step of defining a window having a predetermined size within the selected color image, wherein the image pixels are pixels within the window.

21. The color image processing method according to claim 20, wherein the step (b) includes grouping the sorted pixels using a function based on Fisher's discriminant estimation method.

22. The color image processing method according to claim 19, further comprising, before the step (b), the step of removing pixels having a color distance difference greater than or equal to a predetermined threshold, for a predetermined number of pixels at a beginning and latter parts of the sorted pixels.

23. The color image processing method according to claim 22, further comprising, after step (b-5), the steps of:
selecting pixels whose number corresponds to the size of the peer group, ranging from a pixel having a minimum color distance among the pixels sorted according to the color distance from the central pixel and setting a largest value of the color distances of the selected pixels as a maximum color distance within the peer group; and
weighting color vectors of the respective pixels by exp(−T(n)), wherein T(n) is the maximum color distance within the peer group, and performing color quantization using a value obtained by multiplying an average of the T(n) values of a whole image with a predetermined constant to determine a number of clusters.

24. The color image processing method according to claim 22, wherein the predetermined number is less than or equal to L/2, in which L is a predetermined positive integer indicating the size of and L×L window.

25. The color image processing method according to claim 24, wherein the step (b) includes grouping the sorted pixels using a function based on Fisher's discriminant estimation method.

26. The color image processing method according to claim 22, wherein the step (b) includes grouping the sorted pixels using a function based on Fisher's discriminant estimation method.

27. The color image processing method according to claim 19, wherein the step (b) includes grouping the sorted pixels using a function based on Fisher's discriminant estimation method.

28. The color image processing method according to claim 19, wherein the step (c) includes replacing the central pixel $X_0(n)$ with a new pixel $X_0'(n)$ as follows:

$$X_0'(m) = \frac{\sum_{i=0}^{m(n)-1} W_i p_i(n)}{\sum_{i=0}^{m(n)-1} W_i}$$

where $p_i(n)$ are pixels constituting the peer group and $W_i$ are predetermined weights corresponding to $p_i(n)$.

29. The color image processing method according to claim 28, further comprising, after step (b-5), the steps of:
selecting i pixels ranging from a pixel having a minimum color distance among the pixels sorted according to the color distance from the central pixel and setting a largest value of the color distances of the selected pixels as a maximum color distance within the peer group; and
obtaining an average of T(n) values of a whole image and performing color quantization using a value obtained by multiplying the average value of T(n) with a predetermined constant to determine a number of clusters.

30. The color image processing method according to claim 19, wherein the step (c) includes replacing a color vector of the central pixel with an average color vector value weighted by a predetermined weight that is larger for a pixel closer to the central pixel and is smaller for a pixel distant from the central pixel.

31. The color image processing according to claim 30, wherein the predetermined weight is a value determined by a standard Gaussian function.

32. The color image processing method according to claim 19, wherein the step (b) comprises the sub-steps of:
(b-1) selecting a first group consisting of 0th through (i-1)th pixels, and a second group consisting of ith through Kth pixels, wherein i is an integer from 0 through K and $K=L^2-1$;
(b-2) obtaining respective averages of the color distance differences for pixels of the first and second groups as follows:

$$a_1(i) = \frac{1}{i}\sum_{j=0}^{i-1} d_j(n) \text{ and } a_2(i) = \frac{1}{K+1-i}\sum_{j=1}^{K} d_j(n);$$

(b-3) obtaining respective variances of color distance differences for pixels of the first and second groups are obtained as follows:

$$S_1^2(i) = \sum_{j=0}^{i-1} |d_j(n) - a_1(i)|^2 \text{ and } S_2^2(i) = \sum_{j=1}^{K} |d_j(n) - a_2(i)|^2;$$

(b-4) calculating a value J(i) as follows, using the obtained average and variance:

$$J(i) = \frac{|a_1(i) - a_2(i)|^2}{s_1^2(i) + s_2^2(i)}; \text{ and}$$

(b-5) obtaining a value of i which makes J(i) maximum as follows:

$$m(n) = \underset{i}{\arg}\{\max J(i)\}$$

and selecting pixels ranging from a pixel having a small color distance to a pixel having the obtained value of i to determine a size m(n) of a peer group P(n).

33. The color image processing method according to claim 32, further comprising, after step (b-5), the steps of:
selecting i pixels ranging from a pixel having a minimum color distance among the pixels sorted according to the color distance from the central pixel and setting a largest value of the color distances of the selected pixels as a maximum color distance within the peer group; and
performing color quantization by weighting color vectors of respective pixels by exp(–T(n)), wherein T(n) is the maximum color distance within the peer group.

34. The color image processing method according to claim 32, further comprising, after step (b-5), the steps of:
selecting i pixels ranging from a pixel having a minimum color distance among the pixels sorted according to the color distance from the central pixel and setting a largest value of the color distances of the selected pixels as a maximum color distance within the peer group; and
obtaining an average of T(n) values of a whole image and performing color quantization using a value obtained by multiplying the average value of T(n) with a predetermined constant to determine a number of clusters.

35. A computer readable medium having program codes executable by a computer to perform a color image processing method, the method comprising the steps of:
(a) defining a window having a predetermined size within an input color image;
(b) sorting image pixels according to a color distance between the image pixels and a central pixel;
(c) grouping the sorted pixels into groups in which a difference in an intragroup color distance is minimum and a difference in an intergroup color distance is maximum; and
(d) performing filtering by replacing a central pixel value with a predetermined pixel value determined by pixel values of pixels in the groups.

36. The computer readable medium according to claim 35, wherein before the step (c), the color image processing method further comprises the step of removing pixels having a color distance difference greater than or equal to a predetermined threshold, for a predetermined number of pixels at a beginning and latter parts of the sorted pixels.

37. The computer readable medium according to claim 35, wherein the color image processing method further comprises the steps of:
selecting i pixels ranging from a pixel having the minimum color distance among the pixels sorted according to the color distance from the central pixel and setting a largest value of the color distances of the selected pixels as a maximum color distance within the selected group; and
performing color quantization by weighting color vectors of the respective pixels exp(–T(n)), wherein T(n) is the maximum color distance within the peer group.

38. The computer readable medium according to claim 35, wherein the color image processing method further comprises the steps of:

selecting i pixels ranging from a pixel having a minimum color distance among the pixels sorted according to the color distance from the central pixel and setting a largest value of the color distances of the selected pixels as the maximum color distance within the selected group; and obtaining an average of T(n) values of a whole image and performing color quantization using a value obtained by multiplying the average value of T(n) with a predetermined constant to determine a number of clusters.

39. The computer readable medium according to claim 35, wherein the color image processing method further comprises the steps of:

selecting pixels whose number corresponds to a size of a peer group, ranging from a pixel having a minimum color distance among the pixels sorted according to the color distance from the central pixel and setting a largest value of the color distances of the selected pixels as a maximum color distance within the selected group; and weighting color vectors of the respective pixels by exp(−T(n)), wherein T(n) is the maximum color distance within the selected group, and performing color quantization using a value obtained by multiplying an average of the T(n) values of a whole image with a predetermined constant to determine a number of clusters.

40. The computer readable medium according to claim 35, wherein the color image processing method further comprises the step of receiving a color image frame and segmenting the same into a plurality of color images by a predetermined segmentation method, wherein the color image is an image selected from a plurality of color images.

41. A color image processing apparatus comprising:

sorting means for setting a window of a predetermined size within an input color image and sorting image pixels in the window according to a color distance between the image pixels and a central pixel;

grouping means for grouping the sorted pixels into groups in which a difference in an intragroup color distance is minimum and a difference in an intergroup color distance is maximum; and filtering means for performing filtering by replacing a central pixel value with a predetermined pixel value determined by pixel values of pixels in the groups.

42. The color image processing apparatus according to claim 41, further comprising quantizing means for performing color quantization by weighting color vectors of the respective pixels by exp(−T(n)), wherein T(n) is a maximum color distance within a group having a smallest difference in the color vector from the central pixel within the window.

43. The color image processing apparatus according to claim 41, further comprising quantizing means for obtaining an average of T(n) values of a whole image and performing color quantization using a value obtained by multiplying the average value of T(n) with a predetermined constant to determine a number of clusters, wherein T(n) is a maximum color distance within a group having a smallest difference in a color vector from the central pixel within the window.

44. The color image processing apparatus according to claim 41, further comprising quantizing means for weighting color vectors of the respective pixels by exp(−T(n)), and performing color quantization using a value obtained by multiplying the average of T(n) values of a whole image with a predetermined constant to determine a number of clusters, wherein T(n) is a maximum color distance within a group having a smallest difference in the color vector from the central pixel within the window.

45. The color image processing apparatus according to claim 41, further comprising impulse noise removing means for removing pixels having a color distance difference greater than or equal to a predetermined threshold, for a predetermined number of pixels at,a beginning and latter parts of the sorted pixels.

46. The color image processing apparatus according to claim 41, further comprising segmenting means for receiving a color image frame end segmenting the same into a plurality of color images by a predetermined segmentation method, wherein the color image is an image selected from the plurality of color images.

47. A color image processing method comprising the steps of:

(a) defining a window having a predetermined size within an input color image;

(b) selecting pixels having a color vector similar to that of a central pixel within the window and defining the selected pixels as a group; and (c) performing filtering of blurring using only the pixels within the defined group.

* * * * *